United States Patent
Buck et al.

(10) Patent No.: US 7,627,723 B1
(45) Date of Patent: Dec. 1, 2009

(54) ATOMIC MEMORY OPERATORS IN A PARALLEL PROCESSOR

(75) Inventors: Ian A. Buck, San Jose, CA (US); John R. Nickolls, Los Altos, CA (US); Michael C. Shebanow, Saratoga, CA (US); Lars S. Nyland, Carrboro, NC (US)

(73) Assignee: NVIDIA Corporation, Santa Clara, CA (US)

( * ) Notice: Subject to any disclaimer, the term of this patent is extended or adjusted under 35 U.S.C. 154(b) by 446 days.

(21) Appl. No.: 11/533,896

(22) Filed: Sep. 21, 2006

(51) Int. Cl.
*G06F 13/00* (2006.01)
*G06F 13/28* (2006.01)

(52) U.S. Cl. .................................... 711/155
(58) Field of Classification Search ................ 711/155
See application file for complete search history.

(56) References Cited

U.S. PATENT DOCUMENTS

| | | | |
|---|---|---|---|
| 4,953,101 A * | 8/1990 | Kelleher et al. | 345/505 |
| 2002/0174318 A1 | 11/2002 | Stuttard et al. | |
| 2003/0120880 A1 * | 6/2003 | Banno | 711/155 |

OTHER PUBLICATIONS

Stokes, Jon, Introduction to Multithreading, Superthreading and Hyperthreading, Oct. 3, 2002, http://arstechnica.com/articles/paedia/cpu/hyperthreading.ars.*
S.J. Eggers et al., "Simultaneous Multithreading: A Platform for Next-Generation Processors" IEEE Micro, Sep.-Oct. 1997, p. 12-19.

* cited by examiner

*Primary Examiner*—Pierre-Michel Bataille
*Assistant Examiner*—Edward J Dudek
(74) *Attorney, Agent, or Firm*—Townsend and Townsend and Crew LLP

(57) ABSTRACT

Methods, apparatuses, and systems are presented for updating data in memory while executing multiple threads of instructions, involving receiving a single instruction from one of a plurality of concurrently executing threads of instructions, in response to the single instruction received, reading data from a specific memory location, performing an operation involving the data read from the memory location to generate a result, and storing the result to the specific memory location, without requiring separate load and store instructions, and in response to the single instruction received, precluding another one of the plurality of threads of instructions from altering data at the specific memory location while reading of the data from the specific memory location, performing the operation involving the data, and storing the result to the specific memory location.

20 Claims, 8 Drawing Sheets

```
GATOM:
if (C#.CO) {
    atomic {
        ByteOffset = SR0;
        data = LOAD_DATA(global#, ByteOffset, size);
        DR0 = data;
        data = combine.OP(data, SR1 [, SR2]);
        STORE_DATA(global#, ByteOffset, data, size);
    }
}
Where combine.OP(a, b, c) is
IADD: a + b
EXCH: b
CAS:  (a == b) ? c : a;
IMIN: (a < b) ? a : b;  //   .U32, .S32
IMAX: (a > b) ? a : b;  //   .U32, .S32
INC:  (a >= b) ? 0 : a + 1;
DEC:  (a <= 0) ? b : a - 1;
IAND: a & b
IOR:  a | b
IXOR: a ^ b
```

FIG. 5

```
GRED:
if (C#.CO) {
    atomic {
        ByteOffset = SR0;
        data = LOAD_DATA(global#, ByteOffset, size);
        data = combine.OP(data, SR1)[,SR2]);
        STORE_DATA(global#, ByteOffset, data, size);
    }
}
Where combine.OP(a, b, c) is defined identically to GATOM
```

*FIG. 6*

ATOMIC MEMORY OPERATORS IN A PARALLEL PROCESSOR

BACKGROUND OF THE INVENTION

In a parallel processor, many concurrently executing threads of instructions may be reading and writing to the same memory location independently, that is, without any coordination with one another. These reads and writes may be performed using traditional load and store instructions. However in a parallel execution environment such updates to a region of memory can be problematic. For example, a programmer may need to design the program of instructions in order to ensure, while one thread of instructions is updating the region of memory, the region of memory is not being modified by another thread. A typical update of a memory location involves a load, an update that depends on the load value, and a store to the memory location. During these steps, another thread could perform a store to the same memory location, e.g. as part of its own multi-step update, thereby corrupting a value-dependent update.

The typical solution to this problem is to carefully design the program such that memory regions which are shared between threads are never accessed simultaneously. This is often done programmatically with semaphore objects to "lock" a region of memory or code so that multiple threads cannot simultaneously touch the same region of memory or execute the locked region access code. Only when one thread is done updating the region of memory does it "unlock" that region, so that another thread can take over control of the region. Such traditional approaches involving separate instructions dedicated to the locking, loading, updating, storing, and unlocking of memory locations require significant time to execute, and serialize the parallel execution to one thread at each lock/unlock point, reducing the performance benefit of parallel processing.

Accordingly, there exists a substantial need for achieving efficient memory updates within parallel computing environments that allow multiple threads of instructions to update the same region of memory with minimal conflict.

BRIEF SUMMARY OF THE INVENTION

The present invention relates to methods, apparatuses, and systems for updating data in memory while executing multiple threads of instructions, involving receiving a single instruction from one of a plurality of concurrently executing threads of instructions, in response to the single instruction received, reading data from a specific memory location, performing an operation involving the data read from the memory location to generate a result, and storing the result to the specific memory location, without requiring separate load and store instructions, and in response to the single instruction received, precluding another one of the plurality of threads of instructions from altering data at the specific memory location while reading of the data from the specific memory location, performing the operation involving the data, and storing the result to the specific memory location.

The single instruction may be forwarded to an execution unit capable of maintaining exclusive control of the memory location, wherein the execution unit reads the data from the specific memory location, performs the operation involving the data read from the memory location to generate the result, and stores the result to the specific memory location. The single instruction may be forwarded to the execution unit through an interconnection network. In certain embodiments, the data read from the specific memory location is returned upon execution of the single instruction.

In various embodiments, the single instruction performs a comparison between the data read from the specific memory location and another value and performs a store to the specific memory location based on outcome of the comparison.

A parallel processing unit may perform the steps of receiving the single instruction, reading the data from the specific memory location, performing the operation involving the data, storing the result to the specific memory location, and precluding another one of the plurality of threads of instructions from altering data at the specific memory location.

Thus, special atomic memory instructions may be introduced into the instruction set of a parallel processor. This allows a program utilizing the instruction set to perform atomic updates to memory directly. Some of the atomic instructions enable parallel threads to perform parallel reductions on shared data efficiently, enabling parallel execution of dot products, histograms, voting, and similar algorithms where many concurrent threads contribute incremental values to shared results. Others of the atomic instructions enable parallel threads to manage shared data structures like semaphores, queues, lists, and trees.

BRIEF DESCRIPTION OF THE DRAWINGS

FIG. 5 presents a pseudo code description of the function of a GATOM instruction, according to one embodiment of the invention.

FIG. 6 presents a pseudo code description of the function of a GRED instruction, according to one embodiment of the invention.

DETAILED DESCRIPTION OF THE INVENTION

Illustrative System Description

Figure 1:
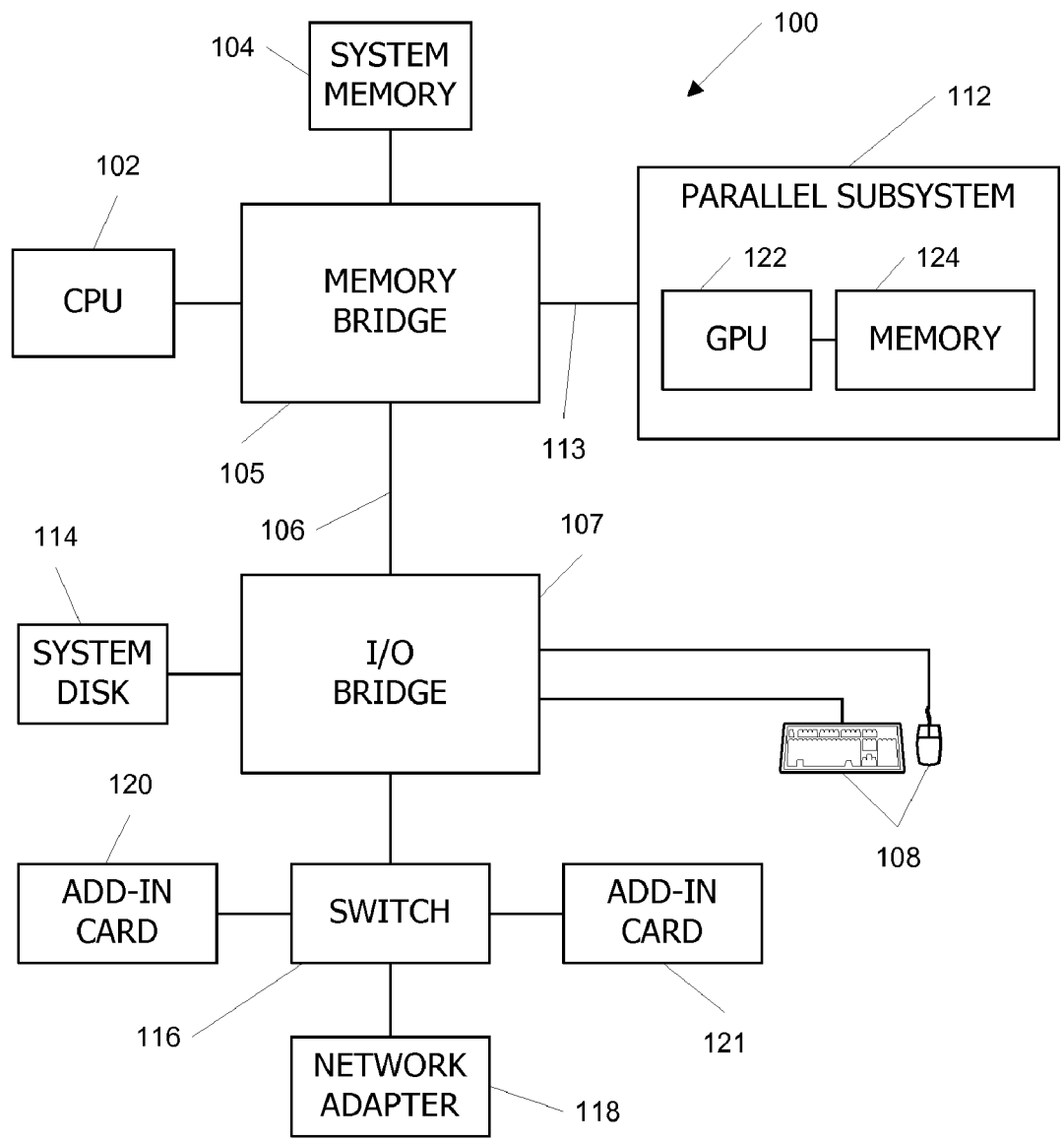
FIG. 1 is a block diagram of a computer system with a parallel processing subsystem according to an embodiment of the present invention.

FIG. 1 is a block diagram of a computer system 100 according to an embodiment of the present invention.

Parallel processing subsystem 112 includes a parallel processing unit or parallel graphics processing unit (GPU) 122 and a memory 124, which may be implemented, e.g., using one or more integrated circuit devices such as programmable processors, application specific integrated circuits (ASICs), field programmable gate arrays (FPGAs), and memory units.

CPU 102 operates as the control processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, memory 124, or another storage location accessible to both CPU 102 and GPU 122. GPU 122 reads the command stream from the command buffer and executes commands independently of CPU 102. The commands may include graphics commands for generating images as well as general-purpose computation commands that enable applications executing on CPU 102 to leverage the computational power of GPU 122 for data processing.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel subsystem 112 is connected to I/O bridge 107 rather than to memory bridge 105. In still other embodiments, I/O bridge 107 and memory bridge 105 might be integrated into a single chip. The particular components shown herein are optional; for instance, any number of add in cards or peripheral devices might be supported. In some embodiments, switch 116 is eliminated, and network adapter 118 and add in cards 120, 121 connect directly to I/O bridge 107.

The connection of GPU 122 to the rest of system 100 may also be varied. In some embodiments, parallel system 112 is implemented as an add in card that can be inserted into an expansion slot of system 100. In other embodiments, a GPU is integrated on a single chip with a bus bridge, such as memory bridge 105 or I/O bridge 107.

A GPU may be provided with any amount of local memory, including no local memory, and may use local memory and system memory in any combination. For instance, in a unified memory architecture (UMA) embodiment, no dedicated memory unit is provided, and the GPU uses system memory exclusively or almost exclusively. In UMA embodiments, the GPU may be integrated into a bus bridge chip or provided as a discrete chip with a high-speed bus (e.g., PCI E) connecting the GPU to the bridge chip and system memory.

It is also to be understood that any number of GPUs may be included in a system, e.g., by including multiple GPUs on a single card or by connecting multiple cards to bus 113. Multiple GPUs may be operated in parallel.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Parallel Processing Subsystem

Figure 2:
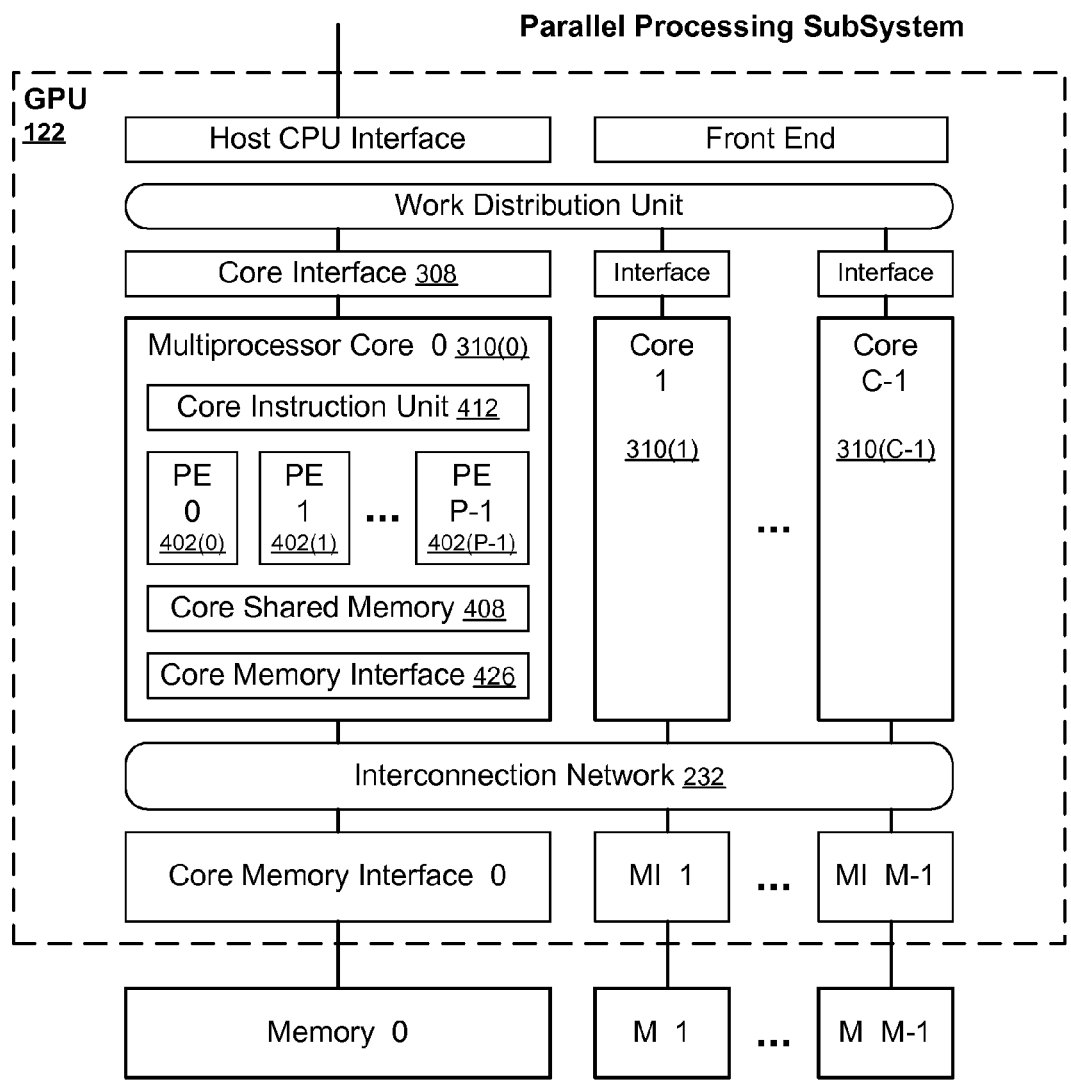
FIG. 2 is a block diagram of a parallel processing subsystem having a multi-core array according to an embodiment of the present invention.

FIG. 2 is a block diagram of a parallel processing subsystem according to an embodiment of the present invention. The subsystem may be configured with multiple processor cores. Each core is a multiprocessor with P parallel processing engines (PEs) 402 that share a core interface 308, core instruction unit 412, core shared memory 408, and core memory interface 426. An interconnection network 232 (e.g., a bus, crossbar switch, multi-stage interconnect, or other multi-port interconnect) connects the C processor cores with M memory interface units and corresponding memories.

Core Architecture

Figure 3:
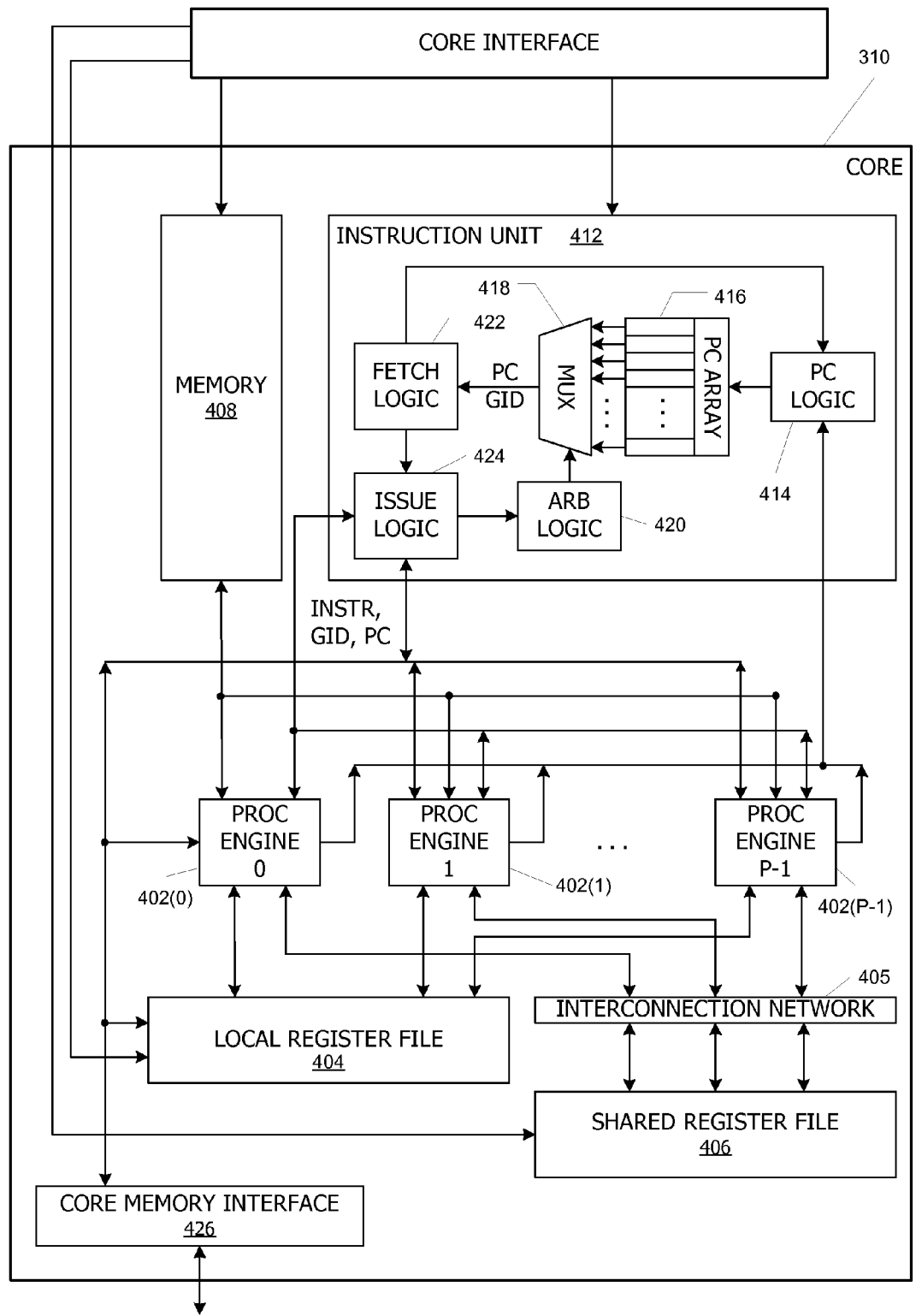
FIG. 3 depicts an example architecture for a representative core.

FIG. 3 is a block diagram of a core 310 according to an embodiment of the present invention. Core 310 is advantageously configured to execute a large number of threads in parallel, where the term "thread" refers to an instance of a particular program executing on a particular set of operand data. In some embodiments, single instruction, multiple data (SIMD) instruction issue techniques are used to support parallel execution of a large number of threads without providing multiple independent instruction fetch units.

In one embodiment, core 310 includes an array of P (e.g., 16) parallel processing engines 402 configured to receive SIMD instructions from a single instruction unit 412. Each parallel processing engine 402 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit shifting, and computation of various algebraic functions (e.g., planar interpolation, trigonometric, exponential, and logarithmic functions, etc.); and the same functional unit hardware can be leveraged to perform different operations.

Each processing engine 402 uses space in a local register file 404 for storing its local operand data, intermediate results, and the like. In one embodiment, local register file 404 is physically or logically divided into P lanes, each having some number of entries (where each entry might be, e.g., a 32 bit word). One lane is assigned to each processing engine, and corresponding entries in different lanes can be populated with data for corresponding threads to facilitate SIMD execution. The number of entries in local register file 404 is advantageously large enough to support multiple concurrent threads per processing engine 402.

Each processing engine 402 also has access, via an interconnection network 405, to a shared register file or shared memory or shared cache 406 that is shared among all of the processing engines 402 in core 310. Shared register file or shared memory or shared cache 406 may be as large as desired, and in some embodiments, any processing engine 402 can read to or write from any location in shared register file 406. In addition to shared register file 406, some embodiments also provide an on chip shared memory 408, which may be implemented, e.g., as a conventional RAM or cache. On chip memory 408 is advantageously used to store data that is expected to be used in multiple threads, such as coefficients of attribute equations, which are usable in pixel shared programs. Processing engines 402 may also have access to off chip shared memory (via the core memory interface 426) which might be located, e.g., within memory 124 of FIG. 1.

ROP Array

Figure 4:
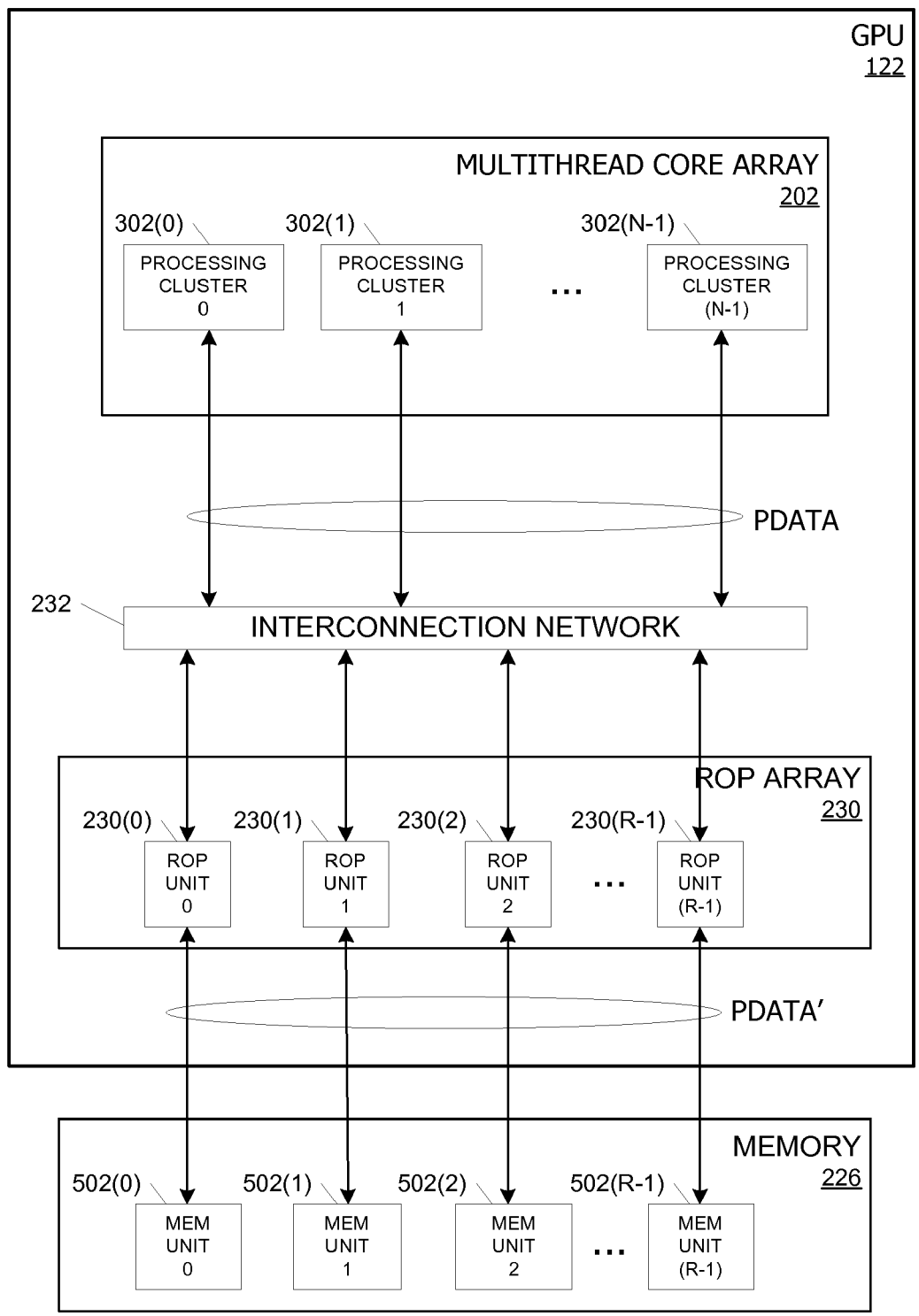
FIG. 4 is a more detailed block diagram of a ROP array and its connection to a multithread core array, via a interconnect, according to one embodiment of the invention.

FIG. 4 is a more detailed block diagram of raster operation (ROP) array 230 and its connection to multithread core array 202, via interconnection network 232, according to one embodiment of the invention. Interconnect 232 may be a bus, crossbar switch, multi-stage interconnection network, or other interconnect fabric. Multithread core array 202 comprises N processing clusters 302, as previously described. ROP array 230 comprises R individual ROP units 230. In the present embodiment of the invention, each ROP unit 230 is responsible for accesses to a particular memory address range in memory 226. Here, memory 226 is conveniently implemented using R individual memory units 502. For example, each memory unit 502 may be an individual semiconductor chip. Each memory unit 502 is connected to a corresponding ROP unit 230 and provides data storage for the memory address range associated with that ROP unit 230.

For certain categories of instructions, such as the "Global" instructions described in later sections, it may more advantageous to execute the instruction by relying substantially on the facilities provided in ROP array 230 as opposed to multithread core array 202. This is especially the case for instructions that require quick updates to memory. Examples of such instructions include "atomic" instructions, which are described in later sections. Thus, threads being handled within multithread core array 202 may encounter instructions that need to be executed using the facilities of ROP array 230.

Interconnect 232 supports these instructions by connecting threads with appropriate ROP units 230. Different configurations may be adopted to achieve such connections. For example, each processing cluster 302 may have a connection to interconnect 232. Alternatively, each core 310 may have a connection to interconnect 232. Still alternatively, each processing engine 402 may have a connection to interconnect 232. Thus, in the representation shown in FIG. 4, each line shown between a processing cluster 302 and interconnect 232 may actually represent a bus or some other type of multiple access interface that allows different threads to be connected to interconnect 232.

Interconnect 232 flexibly connects each thread to the appropriate ROP unit 230. In the present embodiment of the invention, each ROP unit 230 is responsible for a particular address range in memory. Thus, when a thread executes an instruction that requires access to a particular memory address, interconnect 232 connects the thread to the appropriate ROP unit 230 that handles the address range in which that particular memory address falls. In this manner, interconnect 232 facilitates the connection of threads within multithread core array 202 with appropriate ROP units 230 such that particular operations involving memory accesses can be efficiently achieved.

Atomic Instructions

According to an embodiment of the present invention, a class of instructions supported by GPU 122 is referred to herein as "atomic" instructions. Each of these instructions executes atomically in the sense that it, as a single instruction, can perform a series of steps to update the data found at a memory location without being interrupted by another memory access. The series of steps performed by an atomic instruction may include retrieval of the data from the memory location, performance of an operation on that data (such as an addition operation), and storage of the resulting value back to the memory location. In certain embodiments, the steps performed by the atomic instruction may also include returning the data retrieved from the memory location to a register. The entire series of steps is carried out in connection with the single atomic instruction. Before the atomic instruction finishes writing the resulting value back to the memory location, other instructions are precluded from overwriting the data at the memory location.

In a multi-threaded processing unit such as GPU 122, these atomic instructions can be used to prevent memory access conflicts amongst different threads. As previously described, GPU 122 may support SIMD instructions issued across P processing engines 402, with each engine supporting G threads, resulting in P*G threads in flight concurrently. Some of the concurrently executed threads may lead to instructions that access the same memory location. This can cause a memory conflict problem because one instruction may be in the middle of operating on data at a particular memory location, and before the instruction is done, another instruction can alter the data at the memory location. Use of atomic instruction can efficiently prevent such potential memory conflicts.

For example, a first thread may be executing an atomic instruction while a second thread begins another instruction (possibly a different atomic instruction, or a different instance of the same atomic instruction). The atomic instructions are designed such that while the first thread executes its atomic instruction to update the data at a particular memory location, the second thread is not allowed to overwrite the data at that memory location.

GATOM Instructions

Atomic instructions include a category of instructions referred to here as GATOM instructions, according to an embodiment of the invention. A GATOM instruction may implement atomic operations in memory to support parallel program communication. That is, multiple threads corresponding to different programs may concurrently execute atomic instructions that operate on the same memory location. Because atomic instructions operating on the same memory location will be handled such that they do not interfere with one another, the multiple thread from the parallel programs implicitly communicate with each other.

The memory location updated by a GATOM instruction may be part of any memory space accessible to GPU 122, according to various embodiments of the invention. For example, the memory location may be within memory 226 shown in FIG. 4, which can be located, e.g., in graphics memory 124 shown in FIG. 1. According to an embodiment of the invention, the format of a GATOM instruction is as follows:

GATOM.OP{.U32,.S32,.F32} DR0, global#[SR0], SR1 {,SR2}

The ".OP" portion of the GATOM instruction specifies the type of operation to be performed in atomically updating the data at a particular memory location. Operations specified by the ".OP" portion are later described in more detail.

The [.U32, .S32, and .F32] the GATOM instruction specifies the data type, which affects how the data is treated in executing the instruction. For example, ".U32" specifies a 32-bit unsigned integer data type, ".S32" specifies a 32-bit signed integer data type, and ".F32" specifies a 32-bit floating-point data type. If not data type is specified, a default data type may be assumed in executing the GATOM instruction. Other data types may also be implemented in various embodiments of the invention, such as S8 .U8 .S16 .U16 .F16, .S 64, .U64, .F64, and .U128.

The operands of a GATOM instruction may include DR0, global#[SR0], SR1, and [SR2]. As shown, these operands may specify different registers. Here, these registers are referred to as destination register 0 (DR0) and source registers 0, 1, and 2 (SR0, SR1, and SR2). According to an embodiment of the invention, DR0, SR0, SR1, and SR2 may be registers located in local register file 404. The execution of a GATOM instruction is described below.

First, the GATOM instruction loads the data stored at the memory location specified by "global#[SR0]" into DR0. Here, "global#" may be used to specify a particular section of a memory space. For example, "global1" may specify a first section, "global2" may specify a second section, and so on. The SR0 register contains the memory address (e.g., an offset) within the specified section. By loading the data from the memory location "global#[SR0]" into DR0, the data is preserved as it existed at that memory location prior to the GATOM instruction. Having access to the original data at the specified memory location prior to execution of the GATOM instruction can be useful in many scenarios.

Then, the GATOM instruction updates the data at memory location "global#[SR0]" by atomically combining the data with the source value in register SR1 according to the specified operation (".OP"), and writing the result back to memory location "global#[SR0]." For certain specified operations such as integer-add, only one source value other than the memory location is required. In that case, SR1 provides the one source value. For certain specified operations such as compare-and-swap, two source values other than the memory location are required. In that case, SR1 provides one source value, and SR2 provides the other source value. Regardless of which operation is specified, the GATOM instruction executes atomically, meaning that no other thread can access or modify the memory location until the current thread finishes the GATOM instruction.

According to an embodiment of the invention, the specified operation of a GATOM instruction may be one of the following operations: integer-add, exchange, compare-and-swap, increment-mod-N, decrement-mod-N, bitwise and, bitwise or, bitwise xor, integer min, and integer max. Exchange and Compare-and-Swap can be used on integer and FP data. According to another embodiment of the invention, the specified operation may be one of the operations listed above or one of the following operations: integer multiplication, floating-point multiplication, floating-point addition, floating-point min, and floating-point max. Thus, a listing of illustrative operations that can be specified in the ".OP" portion of a GATOM instruction is provided below, where D is destination register DR0, A represents the memory location global#[SR0] containing the original contents of memory location global#[SR0], and which is written with the result of the GATOM instruction; B is source operand register SR1, and C is optional source operand register SR2:

IADD: D=A; A=A+B;
EXCH: D=A; A=B;
CAS: D=A; if (A==B) A=C;
IMIN: D=A; A=(A<B) ? A: B; (e.g., .U32 and .S32)
IMAX: D=A; A=(A>B) ? A: B; (e.g., .U32 and .S32)
INC: D=A; A=(A>=B) ? 0: A+1;
DEC: D=A; A=(A<=0) ? B: A-1;
IAND: D=A; A=A & B;
IOR: D=A; A=A|B; and
IXOR: D=A; A=A^B.

A listing of additional illustrative operations that can be specified in the ".OP" portion of a GATOM instruction, including floating-point operations and multiply operations, is provided below:

FADD: D=A; A=A+B;
FMIN: D=A; (A<B) ? A: B; (including support for −0.0, −Inf, +Inf, and NaN)
FMAX: D=A; (A>B) ? A: B; (including support for −0.0, −Inf, +Inf, and NaN)
IMUL: D=A; A=A*B; and
FMUL: D=A; A=A*B.

While certain operations are listed here, other types of operations can also be specified using ".OP" according to different embodiments of the invention. In one implementation, for the INC and DEC operations, the wrap-around value is provided to the instruction in the form of N-1 instead of N (i.e., supply N-1 in operand B or SR1). This may facilitate a more efficient implementation of the instruction. In an embodiment of the invention, IMIN and IMAX can be used for all normalized and denormalized floating-point values, rather than true floating point FMIN and FMAX, although improper results occur with −0.0, +Inf, −Inf, and NaNs.

FIG. 5 presents a pseudo code description of the function of a GATOM instruction, according to one embodiment of the invention. The entire execution of the instruction may be predicated on a Boolean predicate or a condition code, e.g. by the if ( ) statement. Here, "ByteOffset=SR0" is used to obtain an offset value from register SR0. This offset value represents the offset within the specified section of memory "global#" where the actual memory location is found. Given the specified section of memory "global#" and the offset, the memory location is fully defined. The function LOAD_DATA loads data of a specified size from this memory location. "DR0=data" copies the loaded data to the destination register DR0, before the data is combined with one or more operand values according to the specified operation ".OP." The function combine .OP( ) is defined based on the specified operation ".OP" and is used to perform the combination. The function STORE_DATA stores the updated data back to the memory location.

There is a wide variety of uses that can take advantage of atomic instructions such as GATOM instructions. For instance, certain atomic instructions that perform updates to memory based on arithmetic and bitwise logical operations can be used to implement parallel computations involving multiple contributions of data. For parallel computations, the multiple contributions of data may each provide its update to a specified memory location independently at different times, by different threads. Once all contributions have been made, the parallel computation is complete. This type of computing allows efficiently parallel execution of dot products, histograms, voting, and similar algorithms where many concurrent threads contribute incremental values to shared results.

Other atomic instructions that allow conditional operations such as conditional writes to memory can be used to implement efficient management of shared data structures such as semaphores, queues, lists, and trees. One such example uses a GATOM instruction to implement a pointer for a circular buffer, using the specified atomic operation .INC:

GATOM.INC Rd, mem[&P], Rn

Here, the pointer is stored at the specified memory location "mem[&P]." That is, the pointer is stored at the location in memory corresponding to the memory address held in register "&P." The circular buffer is of size N. Accordingly, a wrap-around value of N is specified. According to one implementation, the wrap-around value provided to the GATOM. INC instruction is N-1 for a buffer of size N. Thus, N-1 is stored into register Rn prior to execution of the instruction. The .INC operation is conditionally executed. If the value of the pointer as it exists in memory at "mem[&P]." is greater than or equal to N-1 (wrap-around), the pointer is reset to "0." Otherwise (no wrap-around), the pointer is incremented by "1." This implements a pointer for a circular buffer of size N that can be shared by multiple threads, parallel and/or sequential.

Yet another use of atomic instructions is the implementation of a routine for controlling competing access to a memory location by concurrently executing threads over the duration of multiple instructions. For example, a GATOM. CAS instruction compare-and-swap (.CAS) operation can be used to build a routine that is executed by one thread to avoid interference from other threads over multiple instructions. Atomic instructions such as GATOM instructions are designed to prevent interference from other threads during the execution of a single atomic update instruction. However, there may still be undesirable interference from other threads between the execution of multiple instructions. For example, a thread may execute a simple routine comprising three instructions: (1) a load of a data value from a memory location, (2) an execution of a function on the data value to generate a result value, and (3) a write of the result value back to the memory location:

LOAD Rold, mem[addr]; //Rold=mem[addr]
Rnew=Function(Rold);
STOREmem[addr], Rnew; //mem[addr]=Rnew;

In a parallel multithread program, another thread that is executing concurrently may interfere with this routine by modifying the data value at the memory location at some point between the executions of these three instructions.

According to an embodiment of the invention, a GATOM instruction with a specified .CAS operation can be used to prevent such undesirable interference. The above routine can be replaced with a modified routine as follows:

Do {LOAD Rold, mem[addr];
Rnew=Function(Rold);
GATOM.CAS Rtemp, mem[addr], Rold, Rnew;
} While (Rtemp !=Rold);

This modified routine saves the initially loaded version of the data value from the memory location mem[addr] in Rold, performs the function to generate the new result value, then conditionally writes the new result value to the memory location. Specifically, if the data value found at the memory location upon the execution of the atomic CAS instruction (Rtemp) does not equal to the initially loaded version of the data value (Rold), then the write is not performed, and the routine is attempted again. The write is cancelled and the routine is attempted again because this indicates that another thread has modified the data value at the memory location during the routine. The do-while loop is used to repeat the attempts, until the data value found at the memory location upon the execution of the .CAS instruction (Rtemp) equals the previously loaded version of the data value (Rold). At that point, the .CAS conditional write is allowed to occur because nothing has modified the data value at the memory location during the routine. This example shows that the GATOM.CAS instruction can be used to avoid interference from other threads, even interference that occurs between the execution of instructions.

GRED Reduction Instructions

Atomic instructions further include a category of instructions referred to here as reduction or GRED instructions, according to an embodiment of the invention. Unlike a GATOM instruction, a GRED instruction does not save the data read from the specified memory location to preserve the data as it existed prior to execution of the instruction. In other respects, a GRED instruction operates in a similar manner as a GATOM instruction.

According to an embodiment of the invention, the format of a GRED instruction is as follows:

GRED.OP{.U32,.S32,.F32} global#[SR0], SR1 {,SR2}

The ".OP" portion of the GRED instruction specifies the type of operation to be performed in atomically updating the data at a particular memory location. Operations specified by the ".OP" portion are later described in more detail.

The GRED instruction suffix {.U32, .S32, or .F32} specifies the data type, which affects how the data is treated in executing the instruction. For example, ".U32" specifies a 32-bit unsigned integer data type, ".S32" specifies a 32-bit signed integer data type, and ".F32" specifies a 32-bit floating-point data type. If no data type is specified, a default data type is assumed in executing the GRED instruction. Other data types may also be implemented in various embodiments of the invention, such as S8 .U8 .S16 .U16 .F16, .S64, .U 64, .F64, and .U128.

The operands of a GRED instruction may include global# [SR0], SR1, and [SR2]. As shown, these operands may specify different registers. Here, these registers are referred to as source registers 0, 1, and 2 (SR0, SR1, and SR2). According to an embodiment of the invention, SR0, SR1, and SR2 may be registers located in local register file 404. The execution of a GRED instruction is described below.

The GRED instruction updates the data at memory location "global#[SR0]" by atomically combining the data with the source value in register SR1 according to the specified operation (".OP"), and writing the result to memory location "global#[SR0]." For certain specified operations such as integer-add, only one source value other than the memory location is required. In that case, SR1 provides the one source value. For certain specified operations such as compare-and-swap, two source values other than the memory location are required. In that case, SR1 provides one source value, and SR2 provides the other source value. Regardless of which operation is specified, the GRED instruction executes atomically, meaning that no other thread can modify the memory location until the current thread finishes the GRED instruction.

According to an embodiment of the invention, the specified operation of a GRED instruction may include any of the specified .OP operations described previously for the GATOM instruction.

Figure 7:
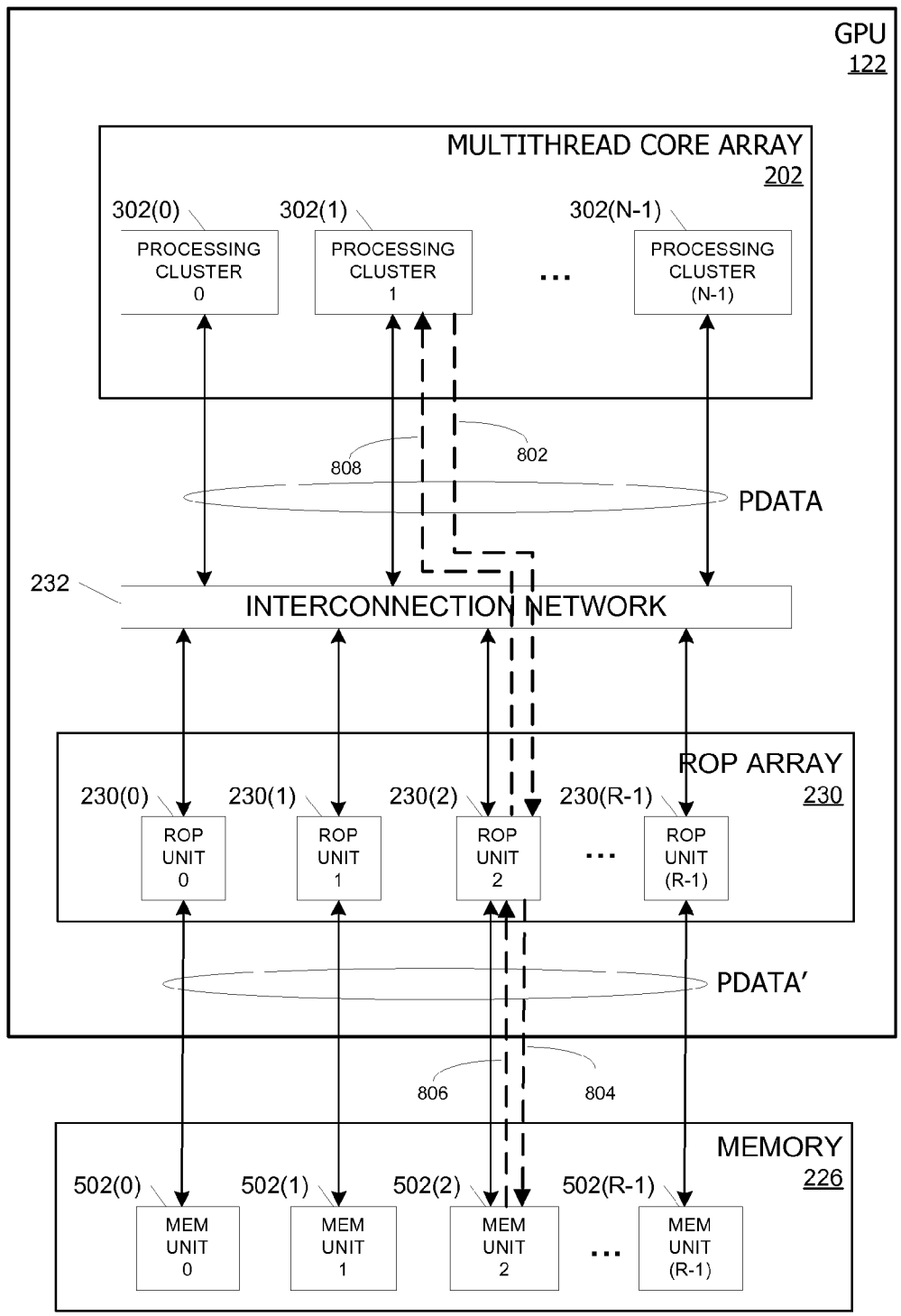
FIG. 7 illustrates an implementation of a GATOM instruction using a ROP array according to an embodiment of the invention.

FIG. 6 presents a pseudo code description of the function of a GRED instruction, according to one embodiment of the invention. The instruction predicates or conditions execution on the Boolean value of a predicate register or condition code register and condition. FIG. 7 uses a condition code register C#, and condition C0, e.g. .LT (less than). Here, "ByteOffset=SR0" is used to obtain an offset value from register SR0. This offset value represents the offset within the specified section of memory "global#" where the actual memory location is found. Given the specified section of memory "global#" and the offset, the memory location is fully defined. The function LOAD_DATA loads data of a predefined size from this memory location. The function combine .OP( ) is defined based on the specified operation ".OP" and is used to perform the combination. The function STORE_DATA stores the updated data back to the memory location (if the predicate or condition code permits the write).

Implementation of Atomic Instructions Using ROP Array

FIG. 7 illustrates an implementation of a GATOM instruction using ROP array 230 according to an embodiment of the invention. As discussed previously, multithread core array 202 contains processing resources for processing numerous concurrently executing threads of instructions. A GATOM instruction from one of the plurality of concurrently executing threads may be executed in one of the processing clusters, such as processing cluster 302(1). For example, the GATOM instruction may be decoded within processing cluster 302(1) by instruction unit 412 within a core 310. Unlike other types of instructions that are executed within the processing clusters 302, atomic instructions that require more direct access to memory are forwarded to appropriate ROP units 230 for execution. A GATOM instruction is such an atomic instruction.

Accordingly, processing cluster 302(1) forwards the GATOM instruction along path 802 to an appropriate ROP unit, in this case ROP unit 230(2). According to an embodiment of the present invention, each ROP unit 230 is responsible for a particular range of memory addresses within memory 226. As discussed previously, one of the operands to a GATOM instruction is a specified memory location that is to be updated. Thus, the GATOM instruction is forwarded to the appropriate ROP unit 230(2) responsible for the range of memory addresses that spans the memory location specified by the GATOM instruction. The GATOM instruction may be forwarded in various formats according to different embodiments of the invention.

Next, ROP unit 230(2) retrieves the data from the specified memory location along path 804. Path 804 is established through interconnect 232, which provides the proper interconnection between processing cluster 302(1) and ROP unit 230(2). Here, ROP unit 230(2) is directly responsible for accesses to the memory range that spans the specified memory location. Thus, ROP unit 230(2) can efficiently obtain the required data from the specified memory location or cache.

ROP unit 230(2) performs the necessary operation(s) involving the data read from the specified memory location. According to an embodiment of the invention, ROP units such as unit 230(2) contain the necessary execution hardware for performing these operations. For example, each ROP unit may contain hardware logic for performing integer and floating operations such as add, subtract, multiply, compare, bitwise logical operations such as AND, OR, and XOR, and the like. Various data types such as those mentioned previously may also be accommodated by such execution hardware.

Once the necessary operation(s) are performed, ROP unit 230(2) writes the result back to the specified memory location along path 806. The result stored back to the memory location may vary depending on the outcome of certain operations, such as a comparison operation involving the data read from the specified memory location. GATOM instructions that are associated with such conditional store back include instruction corresponding to operations ".CAS," ".IMIN," ".IMAX," ".INC," ".DEC" and the like.

In addition, the GATOM instruction also causes the original data read from the specified memory location to be returned upon execution of the instruction, along path 808. Path 808 is established through interconnect 232, which provides the proper interconnection between processing cluster 302(1) and ROP unit 230(2). Thus, the value of the data read from the memory location before any operations are performed is saved and returned. The saved data may be returned to a specified register DR0 located within processor cluster 302(1). For example, the specified register may be one of the registers within register file 404. Having access to the original data at the specified memory location prior to execution of the GATOM instruction can be useful in many scenarios, as mentioned previously.

The series of steps described in connection with FIG. 7 occur atomically in response to a single GATOM instruction. That is, the single atomic instruction updates data at the specified memory location without the need for software to issue separate instructions for loading data from memory or storing data to memory, or perform time consuming memory bus locking and unlocking routines. In the course of executing the single GATOM instruction, the appropriate ROP unit maintains exclusive control over the specified memory location, such that the entire GATOM instruction can be completed with the assurance that no other instruction from another thread can modify the specified memory location during the execution of the current GATOM instruction. In other words, no execution unit other than this ROP unit can modify the data at the specified memory location during execution of the GATOM instruction. This facilitates efficient updates to memory by concurrently executing threads.

A ROP unit can maintain atomic control of a memory location in a number of ways. A simple way is to perform only one atomic instruction at a time, delaying any subsequent memory accesses, including load, store, and atomic instructions, until the pending atomic sequence of read memory, operation, and write memory is complete. This approach performs poorly if the ROP to memory unit roundtrip latency is long. For better performance, a ROP implementation can pipeline multiple atomic operations, by maintaining a list of memory addresses that have pending atomic operations. Any subsequent memory access requests with an address that matches the address of a pending atomic operation in the list are queued until the atomic operation completes, while other accesses proceed normally. A related implementation uses an address mapping function like a cache tag mapping to maintain the access delay list, which will delay memory accesses that map to the same table entry as a pending atomic address, but may cost less area or time than a precise list. The pending atomic address list may use a larger address granularity than the atomic access size, such as a cache line or block, to reduce implementation cost.

Figure 8:
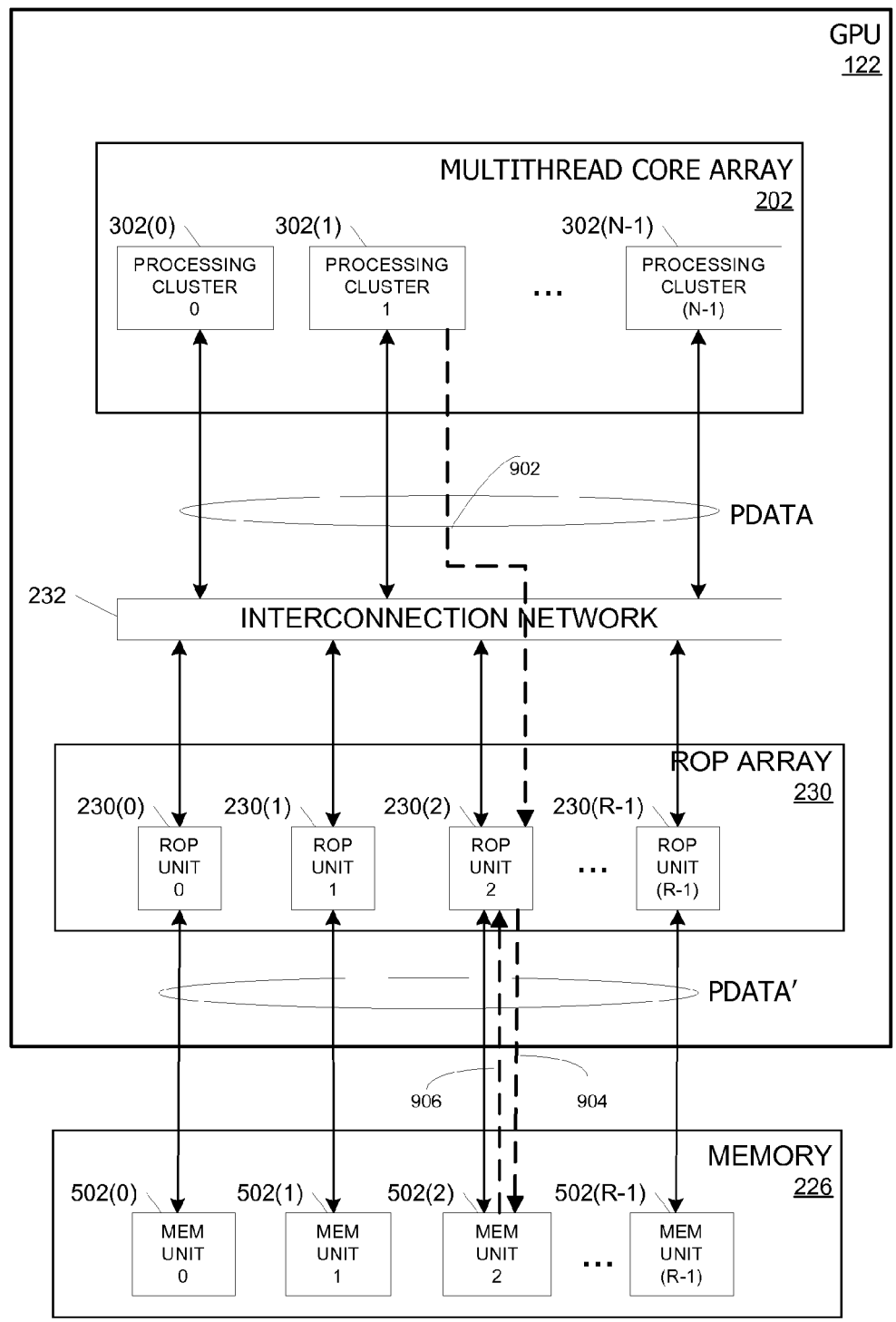
FIG. 8 illustrates an implementation of a GRED instruction using a ROP array according to an embodiment of the invention.

FIG. 8 illustrates an implementation of a GRED instruction using ROP array 230 according to an embodiment of the invention. Unlike a GATOM instruction, a GRED instruction does not return the data read from the specified memory location to preserve the data as it existed prior to execution of the instruction. In other respects, a GRED instruction operates in a similar manner as a GATOM instruction. GRED instructions are also atomic instructions which are forwarded to appropriate ROP units 230 for execution. Thus, the description below may be supplemented by referring to the description provided above for a GATOM instruction in connection with FIG. 7.

Accordingly, processing cluster 302(1) forwards the GRED instruction along path 902 to an appropriate ROP unit, in this case ROP unit 230(2). Next, ROP unit 230(2) retrieves the data from the specified memory location along path 904. Here, ROP unit 230(2) is directly responsible for accesses to the memory range that spans the specified memory location. Thus, ROP unit 230(2) can efficiently obtain the required data from the specified memory location. ROP unit 230(2) performs the necessary operation(s) involving the data read from the specified memory location. Once the necessary operation(s) are performed, ROP unit 230(2) writes the result back to the specified memory location along path 906.

The series of steps described in connection with FIG. 8 occur in response to a single GRED instruction. That is, the single atomic instruction updates data at the specified memory location without the need to issue separate instructions for loading data from memory or storing data to memory, or perform resource intensive memory bus locking and unlocking routines. In the course of executing the single GRED instruction, the appropriate ROP unit maintains exclusive control over the specified memory location, such that the entire GRED instruction can be completed with the assurance that no other instruction from another thread can modify the specified memory location during the execution of the current GRED instruction. This facilitates efficiently updates to memory by concurrently executing threads.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for updating data in memory while executing multiple threads of instructions, the method comprising:
   receiving a single instruction from one of a plurality of concurrently executing threads of instructions;
   in response to the single instruction received, reading data from a specific memory location, performing an operation involving the data read from the memory location to generate a result, and storing the result to the specific memory location, without requiring separate load and store instructions, wherein the single instruction is forwarded to an execution unit of a plurality of execution units capable of maintaining exclusive control of the memory location in a memory shared by the plurality of execution units, wherein the execution unit reads the data from the specific memory location, performs the operation involving the data read from the memory location to generate the result, and stores the result to the specific memory location, wherein each execution unit is allocated a portion of the memory, and wherein the execution unit to which instruction is forwarded is selected from the plurality of execution units if a memory address associated with the first instruction falls within an address range associated with the portion of memory allocated to the execution unit; and
   in response to the single instruction received, precluding another one of the plurality of threads of instructions from altering data at the specific memory location while reading the data from the specific memory location, performing the operation involving the data, and storing the result to the specific memory location.

2. The method of claim 1 wherein the single instruction is forwarded to the execution unit through a crossbar connection.

3. The method of claim 1 wherein the data read from the specific memory location is returned upon execution of the single instruction.

4. The method of claim 1 wherein the single instruction performs a comparison between the data read from the specific memory location and another value and performs a store to the specific memory location based on outcome of the comparison.

5. The method of claim 4 wherein the data read from the specific memory location is compared with an operand value, and depending on outcome of the comparison, either the data or a second instruction operand value is stored to the specific memory location.

6. The method of claim 4 wherein the data read from the specific memory location is compared with an operand value, and depending on the outcome of the comparison, either the data or the operand value is stored to the specific memory location.

7. The method of claim 4 wherein the data read from the specific memory location is compared with an operand value, and depending on the outcome of the comparison, either an incremented version of the data or a predefined value is stored to the specific memory location.

8. The method of claim 4 wherein the data read from the specific memory location is compared with a predefined value, and depending on the outcome of the comparison, either a decremented version of the data or an operand value is stored to the specific memory location.

9. The method of claim 1 wherein the steps of receiving the single instruction, reading the data from the specific memory location, performing the operation involving the data, storing the result to the specific memory location, and precluding another one of the plurality of threads of instructions from altering data at the specific memory location are performed within a graphics processing unit.

10. An apparatus for updating data in memory while executing multiple threads of instructions comprising:
    an instruction unit for decoding a single instruction from one of a plurality of concurrently executing threads of instructions;
    a memory buffer;
    a plurality of execution units coupled to the instruction unit and the memory buffer, the memory being shared by the plurality of execution units, the execution units capable of receiving the single instruction, and in response to the single instruction received, reading data from a specific memory location in the memory buffer, performing an operation involving the data read from the memory location to generate a result, and storing the result to the specific memory location, without requiring separate load and store instructions; and
    wherein the execution unit is further capable of, in response to the single instruction received, precluding another one of the plurality of threads of instructions from altering data at the specific memory location while reading of the data from the specific memory location, performing the operation involving the data, and storing the result to the specific memory location,
    wherein each execution unit is allocated a portion of the memory, and
    wherein an execution unit of the plurality of execution units is selected to execute the instruction, the execution unit being selected from the plurality of execution units if a memory address associated with the first instruction falls within an address range associated with the portion of memory allocated to the execution unit.

11. The apparatus of claim 10 wherein the execution unit is capable of maintaining exclusive control of the memory location.

12. The apparatus of claim 11 further comprising an interconnection network between the instruction unit and the execution unit, the interconnection network capable of forwarding the single instruction to the execution unit.

13. The apparatus of claim 10 wherein the execution unit is capable of returning the data read from the specific memory location upon execution of the single instruction.

14. The apparatus of claim 10 wherein the execution unit is capable of executing the single instruction by performing a comparison between the data read from the specific memory location and another value and performs a store to the specific memory location based on outcome of the comparison.

15. The apparatus of claim 14 wherein the execution unit is capable of comparing the data read from the specific memory location with an operand value, and depending on outcome of the comparison, storing either the data or an alternative value to the specific memory location.

16. The apparatus of claim 14 wherein the execution unit is capable of comparing the data read from the specific memory location with an operand value, and depending on the output of the comparison, storing either the data or the operand value to the specific memory location.

17. The apparatus of claim 14 wherein the execution unit is capable of comparing the data read from the specific memory location with an operand value, and depending on the outcome of the comparison, storing either an incremented version of the data or a predefined value to the specific memory location.

18. The apparatus of claim 14 wherein the execution unit is capable of comparing the data read from the specific memory location with a predefined value, and depending on the output of the comparison, storing either a decremented version of the data or an operand value to the specific memory location.

19. The apparatus of claim 10 wherein instruction unit and execution unit are positioned within a graphics processing unit.

20. A system for updating data in memory while executing multiple threads of instructions, the system comprising:

means for receiving a single instruction from one of a plurality of concurrently executing threads of instructions;

means for, in response to the single instruction received, reading data from a specific memory location, performing an operation involving the data read from the memory location to generate a result, and storing the result to the specific memory location, without requiring separate load and store instructions, wherein the single instruction is forwarded to an execution unit of a plurality of execution units capable of maintaining exclusive control of the memory location in a memory shared by the plurality of execution units, wherein the execution unit reads the data from the specific memory location, performs the operation involving the data read from the memory location to generate the result, and stores the result to the specific memory location, wherein each execution unit is allocated a portion of the memory, and wherein the execution unit to which instruction is forwarded is selected from the plurality of execution units if a memory address associated with the first instruction falls within an address range associated with the portion of memory allocated to the execution unit; and means for, in response to the single instruction received, precluding another one of the plurality of threads of instructions from altering data at the specific memory location while reading of the data from the specific memory location, performing the operation involving the data, and storing the result to the specific memory location.

* * * * *

UNITED STATES PATENT AND TRADEMARK OFFICE
CERTIFICATE OF CORRECTION

PATENT NO. : 7,627,723 B1 Page 1 of 1
APPLICATION NO. : 11/533896
DATED : December 1, 2009
INVENTOR(S) : Buck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this

Twenty-first Day of December, 2010

David J. Kappos
*Director of the United States Patent and Trademark Office*